(12) United States Patent
Young et al.

(10) Patent No.: US 8,843,303 B1
(45) Date of Patent: Sep. 23, 2014

(54) RISK-AWARE CONTINGENCY FLIGHT RE-PLANNER SYSTEM AND RELATED METHOD

(71) Applicants: Shih-Yih Young, Marion, IA (US); Kristen M. Jerome, Monticello, IA (US)

(72) Inventors: Shih-Yih Young, Marion, IA (US); Kristen M. Jerome, Monticello, IA (US)

(73) Assignee: Rockwell Collins, Inc., Cedar Rapids, IA (US)

(*) Notice: Subject to any disclaimer, the term of this patent is extended or adjusted under 35 U.S.C. 154(b) by 133 days.

(21) Appl. No.: 13/717,012

(22) Filed: Dec. 17, 2012

(51) Int. Cl.
  *G01C 21/34* (2006.01)
  *G08G 5/00* (2006.01)

(52) U.S. Cl.
  CPC ............ *G08G 5/0034* (2013.01); *G08G 5/0039* (2013.01)
  USPC ............................ 701/122; 701/411; 701/416

(58) Field of Classification Search
  None
  See application file for complete search history.

(56) References Cited

U.S. PATENT DOCUMENTS

| | | | | |
|---|---|---|---|---|
| 5,802,492 | A * | 9/1998 | DeLorme et al. ........... | 455/456.5 |
| 6,127,944 | A * | 10/2000 | Daly et al. .................... | 340/963 |
| 6,347,263 | B1 * | 2/2002 | Johnson et al. ................. | 701/14 |
| 6,421,603 | B1 * | 7/2002 | Pratt et al. ..................... | 701/528 |
| 6,748,325 | B1 * | 6/2004 | Fujisaki ......................... | 701/301 |
| 6,785,610 | B2 * | 8/2004 | Baker et al. .................... | 701/301 |
| 6,940,426 | B1 * | 9/2005 | Vaida ............................. | 340/963 |
| 7,194,353 | B1 * | 3/2007 | Baldwin et al. ............... | 701/528 |
| 7,437,245 | B2 * | 10/2008 | Ybarra et al. .................. | 701/301 |
| RE41,271 | E * | 4/2010 | Vaida ............................. | 340/963 |
| 7,970,532 | B2 * | 6/2011 | Tehan et al. .................... | 701/423 |
| 8,234,068 | B1 * | 7/2012 | Young et al. ................... | 701/528 |
| 8,725,417 | B1 * | 5/2014 | Young et al. ................... | 701/533 |
| 2001/0023390 | A1 * | 9/2001 | Gia ................................ | 701/301 |
| 2002/0183922 | A1 * | 12/2002 | Tomasi et al. ................. | 701/202 |
| 2003/0122701 | A1 * | 7/2003 | Tran ............................... | 342/29 |
| 2003/0182052 | A1 * | 9/2003 | DeLorme et al. ............. | 701/201 |
| 2006/0155432 | A1 * | 7/2006 | Brown ............................. | 701/14 |
| 2006/0168592 | A1 * | 7/2006 | Andrews et al. .............. | 719/318 |
| 2006/0224302 | A1 * | 10/2006 | Kwok et al. ................... | 701/200 |
| 2006/0287827 | A1 * | 12/2006 | Tran ............................... | 701/301 |
| 2007/0129855 | A1 * | 6/2007 | Coulmeau ........................ | 701/3 |
| 2007/0198143 | A1 * | 8/2007 | Ybarra et al. ..................... | 701/9 |
| 2007/0222666 | A1 * | 9/2007 | Coulmeau ........................ | 342/32 |
| 2008/0059058 | A1 * | 3/2008 | Caillaud et al. ............... | 701/206 |
| 2008/0228333 | A1 * | 9/2008 | De Menorval et al. ......... | 701/14 |
| 2008/0270331 | A1 * | 10/2008 | Taylor et al. .................... | 706/13 |
| 2008/0306680 | A1 * | 12/2008 | Marty et al. ................... | 701/201 |
| 2009/0125225 | A1 * | 5/2009 | Hussain et al. ................ | 701/200 |
| 2009/0150012 | A1 * | 6/2009 | Agam et al. ....................... | 701/3 |
| 2010/0100308 | A1 * | 4/2010 | Coulmeau et al. ............. | 701/122 |
| 2010/0103029 | A1 * | 4/2010 | Khatwa et al. ............. | 342/26 B |

(Continued)

*Primary Examiner* — Thomas Tarcza
*Assistant Examiner* — Richard Goldman
(74) *Attorney, Agent, or Firm* — Donna P. Suchy; Daniel M. Barbieri (57) ABSTRACT

A method and related system is disclosed for risk-aware contingency flight re-planning of a vehicle's pre-planned route. The system receives a desired Risk Tolerance Level (RTL) for the pre-planned route from a decision maker. As a mission time progresses, changing threats pose an unknown level of risk to the vehicle and crew. The system receives an unplanned threat to mission success of the vehicle and qualifies the received unplanned threat with a Risk Type (RT). The system generates and evaluates possible 4-D re-routes based on the RTL and RT coupled with physical attributes of the possible 4-D re-route. Additionally, the re-planner associates a cost to each of the possible 4-D re-routes and presents ranked possibilities to the decision maker for selection and activation.

22 Claims, 8 Drawing Sheets

(56) References Cited

U.S. PATENT DOCUMENTS

| | | | |
|---|---|---|---|
| 2010/0121575 A1* | 5/2010 | Aldridge et al. | 701/301 |
| 2010/0217528 A1* | 8/2010 | Sato et al. | 701/301 |
| 2010/0228468 A1* | 9/2010 | D'Angelo | 701/120 |
| 2011/0149957 A1* | 6/2011 | Lee et al. | 370/389 |
| 2012/0191332 A1* | 7/2012 | Sawhill et al. | 701/120 |
| 2012/0215505 A1* | 8/2012 | Srivastav et al. | 703/6 |
| 2012/0271491 A1* | 10/2012 | Spata | 701/3 |
| 2013/0046422 A1* | 2/2013 | Cabos | 701/3 |
| 2014/0142785 A1* | 5/2014 | Fuentes et al. | 701/2 |

\* cited by examiner

| Risk Type (RT) | Risk Tolerance Level (RTL) | | | | |
|---|---|---|---|---|---|
| | Level 0 | Level 1 | Level 2 | Level 3 | Level 4 |
| Threat | 0 | $\eta_1$ | $\eta_2$ | $\eta_3$ | $\eta_4$ |
| Fuel | 0 | $\mu_1$ | $\mu_2$ | $\mu_3$ | $\mu_4$ |
| Required Time on Target | 0 | $\mu_1$ | $\mu_2$ | $\mu_3$ | $\mu_4$ |

| | |
|---|---|
| 802 | receiving a preplanned route, said preplanned route planned for a 3-D routing of a vehicle, said preplanned route activated within said vehicle prior to a departure of said vehicle |
| 804 | receiving a risk tolerance level from a decision maker |
| 806 | receiving input from a threat database, a terrain database, an obstacle database, a threat lethality database, a fuel evaluator, a terrain masking evaluator, a time evaluator, and a vehicle performance database |
| 808 | receiving an indication of an en route risk to said vehicle, said en route risk having a risk type |
| 810 | determining a plurality of 4-D paths for said vehicle to traverse, each 4-D path comprised of a plurality of 4-D states, each 4-D state selected for said 4-D path based on said risk tolerance level and said received input |
| 812 | associating at least one of: a path cost, a time cost, a threat level, an arc cost, and an extra traversal cost with each of said plurality of 4-D paths |
| 814 | ranking said plurality of 4-D paths, said ranking based on said risk tolerance level, said risk type, and said associating |
| 816 | displaying a portion of said plurality of 4-D paths to said decision maker, said portion determined by said ranking |
| 818 | receiving a path selection from said decision maker, said path selection designating and activating a selected 4-D path from said portion |
| 820 | displaying said activated 4-D path to an operator of said vehicle |

RISK-AWARE CONTINGENCY FLIGHT RE-PLANNER SYSTEM AND RELATED METHOD

FIELD OF THE INVENTION

The present invention relates generally to routing of aircraft. More particularly, embodiments of the present invention relate to a system and method for risk-aware re-routing and re-planning based on a user's tolerance to risk and real time contingency threats.

BACKGROUND OF THE INVENTION

Aircraft may encounter expected threats along a route during the transit portion of a mission. Such threats may include weather, winds, terrain, obstacles, a hostile surface threat, and a hostile airborne threat. These expected or pre-planned threats may pose a certain level of risk to an aircrew and passengers before a mission is begun. A commander or dispatcher may rely on these known threats to make critical decisions concerning the flight.

Such critical pre-mission decisions may include a fueling amount, a cargo load, a weapons loadout, a specific configuration (e.g., one or two external fuel tanks, more or less ordnance, more counter air ordinance, more counter surface ordnance), a dispatch limit based on external statutory regulations, and aircrew flight time limitations. As a flight may progress over time, these pre-mission decisions may become inaccurate or obsolete.

Aircraft may also encounter unexpected threats en-route to a destination. Such unexpected threats may include a changed weather system, a pop-up signal jammer, an unplanned surface-to-air missile radar or battery, a volcano eruption, or a recently erected obstacle. Since risk-free paths may be ineffective for a number of reasons, these unexpected threats may require a pilot to shoulder an unknown additional level of risk in order to accomplish the primary objectives of the mission.

Unexpected threats may pose additional risk to an aircrew if the aircrew makes a routing decision based on inaccurate or obsolete information. Also, the aircrew may suffer loss of situational awareness leading to a routing decision which may lead the aircraft into a more hazardous situation than would be the case had an accurate routing decision been made or the aircraft has stayed the originally planned route.

A specific route of flight may present a specific level of risk to a pilot. For example, to reach a target at a required time-on-target (RToT), the flight path may be required to penetrate known threat zones of low level lethality. Such low level lethality zones may include a detection range of a surveillance radar system or within a detection range of a target tracking radar system.

These low level lethality threat zones however do not include zones within which a flight may experience a high level of lethality. Such high level lethality may be found within the engagement range of surface to air missiles or within the range of air to air weapons. The lethality of these high lethality threat zones may be reduced however with a short exposure in such a threat zone.

Pilots are under considerable stress in a combat environment. Decisions made based on erroneous information or decisions made quickly without regard to possible threats may place an aircraft in a more lethal zone than a previous zone. Should a decision be inaccurate, consequences may be catastrophic.

Traditional methods of risk reduction may be labeled differently by entities tasked with least risk routing. The U.S. Air Force labels the technique used by some Air Force planners Reduced Risk Routing as the goal may be to reduce risk inherent to a specific routing. The intended purpose of the Reduced Risk Routing capability may be to facilitate a pilot's decision making process, while increasing aircraft survivability in dense threat environments.

Commercial air carriers may label a specific route as a "track" offering a preferred routing in a geographic area. For example, North Atlantic Tracks are published daily and indicate to aircraft transiting the North Atlantic a preferred route through that airspace based on winds, weather, and additional factors.

Sea surface traffic may also endeavor to transit on routes which offer the least amount of risk for ships at sea. For example, a Sail on Routes that Reduce Risk guidance may be offered to navigators to enable ships to transit an area while doing so at a lower risk level.

A ground based platoon commander may visually survey a geographical area before determining a level of risk associated with the proposed routing. Should the commander visually acquire a threat along the route, he may alter the proposed routing to reduce or eliminate the threat.

On-board computing resources may be limited to reduce weight and power consumption. For example, computing resources on a fighter jet may be a fraction of that available to a team of route planners in a ground based operations center. Placing powerful heavyweight computers onboard an aircraft may be one traditional method of solving the problem, however, aircraft performance would suffer greatly as an equal reduction in payload must be made.

However, each of these attempts at real time path planning has proven unreliable or ineffective when attempted to be incorporated in a lightweight tactical platform.

Consequently, a need exists for development of a real time risk-aware contingency flight re-planner capable of automated presentation of accurate, time sensitive, re-route planning information on-board a light weight platform. Each re-route including a threat level associated with the re-route enabling a decision maker to make an informed threat-based decision.

SUMMARY OF THE INVENTION

Accordingly, an embodiment of the present invention is directed to a method for risk-aware contingency flight re-planning, comprising: receiving a preplanned route, the preplanned route planned for a 3-D routing of a vehicle, the preplanned route activated within the vehicle prior to a departure of the vehicle, receiving a risk tolerance level from a decision maker, receiving input from a threat database, a terrain database, an obstacle database, a threat lethality database, a fuel evaluator, a terrain masking evaluator, a time evaluator, and a vehicle performance database, receiving an indication of an en route risk to the vehicle, the en route risk having a risk type, determining a plurality of 4-D paths for the vehicle to traverse, each 4-D path comprised of a plurality of 4-D states, each 4-D state selected for the 4-D path based on the risk tolerance level and the received input, associating at least one of: a path cost, a time cost, a threat level, an arc cost, and an extra traversal cost with each of the plurality of 4-D paths, ranking the plurality of 4-D paths, the ranking based on the risk tolerance level, the risk type, and the associating, displaying a portion of the plurality of 4-D paths to the decision maker, the portion determined by the ranking, receiving a path selection from the decision maker, the path selection designating and activating a selected 4-D path from the portion, and displaying the activated 4-D path to an operator of the vehicle.

An additional embodiment of the present invention is directed to a computer readable medium having non-transitory computer readable program code embodied therein for risk-aware contingency flight re-planning, the computer readable program code comprising instructions which, when executed by a computer device or processor, perform and direct the steps of: receiving a preplanned route, the preplanned route planned for a 3-D routing of a vehicle, the preplanned route activated within the vehicle prior to a departure of the vehicle, receiving a risk tolerance level from a decision maker, receiving input from a threat database, a terrain database, an obstacle database, a threat lethality database, a fuel evaluator, a terrain masking evaluator, a time evaluator, and a vehicle performance database, receiving an indication of an en route risk to the vehicle, the en route risk having a risk type, determining a plurality of 4-D paths for the vehicle to traverse, each 4-D path comprised of a plurality of 4-D states, each 4-D state selected for the 4-D path based on the risk tolerance level and the received input, associating at least one of: a path cost, a time cost, a threat level, an arc cost, and an extra traversal cost with each of the plurality of 4-D paths, ranking the plurality of 4-D paths, the ranking based on the risk tolerance level, the risk type, and the associating, displaying a portion of the plurality of 4-D paths to the decision maker, the portion determined by the ranking, receiving a path selection from the decision maker, the path selection designating and activating a selected 4-D path from the portion, and displaying the activated 4-D path to an operator of the vehicle.

It is further contemplated embodiments of the present invention may comprise a 3-D route planned for an aircraft and a 4-D path, a 3-D path, and a 2-D path. Further, the risk tolerance level may further comprise a plurality of levels of risk tolerance, the plurality of levels of risk tolerance based on the input from the decision maker. Additionally, the received input further may further comprises an attribute of a medium through which the vehicle is designed to traverse and the indication of an en route risk to the vehicle may further comprise an indication of a hostile surface threat, a weather threat, a hostile airborne and space-based threat, and a subsurface threat.

It is further contemplated, present invention may include embodiments where the risk type further comprises one of: a threat risk, a fuel risk, and a required time on target risk and the receiving an indication may be configured for one of: a digital or analog data link, a VHF signal, and a satellite communications system. Additionally, embodiments of the present invention may further comprise an output configured for an ARINC standard and readable by a specific flight management system.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

The following description presents certain specific embodiments of the present invention. However, the present invention may be embodied in a multitude of different ways as defined and covered by the claims. In this description, reference is made to the drawings wherein like parts are designated with like numerals throughout.

The present invention operates in concert with a real-time auto router named Airborne E* (pronounced as E Star) that maintains the in-flight, long-range 4-D trajectory re-planning capability and was designed to meet desired automated routing requirements. Airborne E* is described in 1) U.S. Pat. No. 8,234,068B1 ('068 Patent), issued Jul. 31, 2012, filed: Jan. 15, 2009, entitled "System, Module, and Method of Constructing a Flight Path Used by an Avionics System," to Young, et. al. and 2) U.S. Pat. No. 8,725,417 ('417 Patent) entitled "Rapid Intervisibility Determination In Resource-Constrained Computational Environments" filed on Aug. 27, 2010, by Young, et. al, both of which are incorporated by reference herein in their entirety.

This and all other referenced patents and applications are incorporated herein by reference in their entirety. Furthermore, where a definition or use of a term in a reference, which is incorporated by reference herein is inconsistent or contrary to the definition of that term provided herein, the definition of that term provided herein applies and the definition of that term in the reference does not apply.

Preferred embodiments of the present invention may construct alternate routes for a vehicle in motion (here an aircraft) based on Airborne E* path information combined with a threat level of each path. These alternate path options are presented to a decision maker charged with the responsibility of moving the vehicle from a first point to a second point. Each of these alternate route decisions is associated with a level of risk when presented to the decision maker. These alternatives offer the decision maker (here a pilot) an ability to accurately make an informed decision based on a time sensitive set of facts.

When constructing alternative paths to achieve mission objectives, the Risk-Aware Contingency Flight Re-Planner may receive a plurality of inputs to determine the alternate routes. Such inputs may include a plurality of levels of risk, a risk type, and a decision maker's tolerance to each level of risk. The flight re-planner analyzes path risk based on the level of threat lethality, the risk type and the user tolerance to risk, when generating a risk-aware flight path for the mission. Furthermore, to enable decision makers to examine the effect of different risk tolerance levels on flight paths, the flight re-planner generates and displays multiple risk-aware routes with each route designed for a different risk tolerance level.

The Risk-Aware Contingency Flight Re-Planner may preferably empower the decision maker (a pilot, ship's Captain, Platoon commander, etc.) charged with transiting from one point to a second point with the awareness of real time threats along a proposed route. The re-planner may offer a list of proposed alternate routes, and indicate the level of risk associated with each of the proposed new routes enabling the operator the ability to choose the route offering the least risk while still maintaining the integrity of the mission.

One goal of the Risk-Aware Contingency Flight Re-Planner may include a search of a digital terrain database over a designated area, such as a circle with a radius of 200 nautical miles (NM), to ensure the re-planned long-range paths are free of terrain.

An additional goal of the Risk-Aware Contingency Flight Re-Planner may include a calculation of possible benefits of terrain masking enabling the construction of shorter paths while still ensuring the safety of the aircraft from en route threats.

An additional goal of the Risk-Aware Contingency Flight Re-Planner may include an analysis of 1) the level of threat lethality in a specific zone and 2) a pilot's tolerance to risk, while constructing risk-aware routes.

An additional goal of the Risk-Aware Contingency Flight Re-Planner may include construction of risk-aware routes that may comply with a required time on target (RToT) constraint.

An additional goal of the Risk-Aware Contingency Flight Re-Planner may include simultaneous avoidance of multiple moving and stationary threats.

An additional goal of the Risk-Aware Contingency Flight Re-Planner may include construction of a 4-D (3-D plus time) flight plan that is flyable based on aircraft performance capabilities and limitations.

An additional goal of the Risk-Aware Contingency Flight Re-Planner may include generation of multiple risk-aware routes with each route designed for a different risk tolerance level. This list of routes may enable the decision maker to examine the effect of different risk tolerance levels on proposed flight paths.

An additional goal of the Risk-Aware Contingency Flight Re-Planner may include generation of the risk-aware flight plan in a format that is compatible with Flight Management System (FMS) interfaces for display on various types of cockpit displays.

An additional goal of the Risk-Aware Contingency Flight Re-Planner may include completion of the generation of risk-aware flight plans within a designated operationally reliable time period while hosted on an onboard computational platform with limited memory and processor speed.

These goals may present a challenge to limited onboard computational resources by requiring a great amount of data to be processed within seconds. The Risk-Aware Contingency Flight Re-Planner meets these technical goals by adapting efficient Artificial Intelligence algorithms and taking specific steps to optimize the use of onboard memory.

Optimizing the flight path in-flight to take into account real-time unforeseen events, such as wind conditions, moving storm cells, or pop-up tactical threats, may enable aircraft to fly a safer and more fuel efficient route than the flight path created before takeoff. However, it is essential that terrain data, aircraft performance limits, and flight operational constraints are also analyzed when modifying the active flight plan in-flight. An autonomous flight planner is well suited for this kind of tasks and may be used to relieve pilot workload.

The proposed Risk-Aware Contingency Flight Re-planner is adapted from the Airborne E* (E Star) real-time 4-D flight planner discussed in the '068 Patent and the '068 Patent. Thus, similar to Airborne E*, this Risk-Aware Contingency Flight Re-planner may uses a layered approach to transform the path planning problem that is NP-hard (non-deterministic polynomial-time hard), to a problem that may be solved efficiently in real-time and in resource-constrained computational environments.

Figure 1:
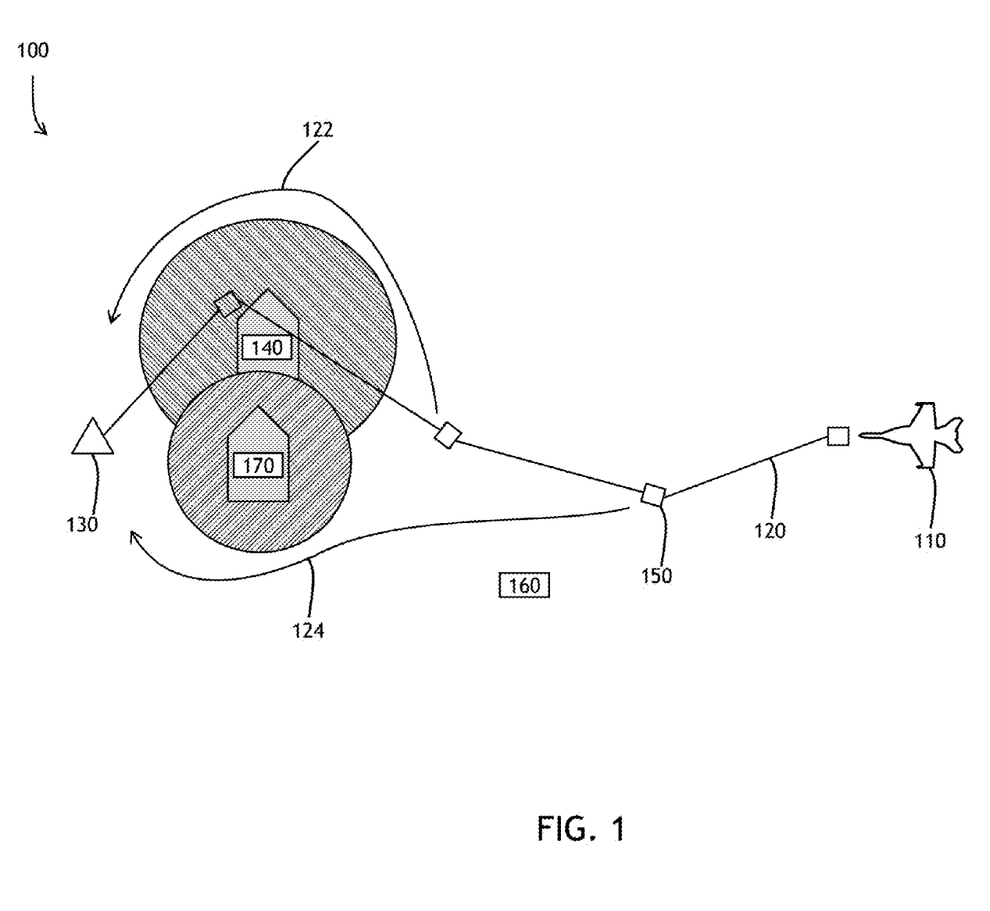
FIG. 1 is an overview of a re-route capability provided by a preferred embodiment of the present invention.

Referring to FIG. 1, an overview of a re-route capability provided by a preferred embodiment of the present invention is shown. The risk-aware contingency flight re-planner may preferably include hardware and software self-contained within lightweight avionics onboard aircraft 110. Before departure, aircraft 110 may be pre-planned on original route 120 to traverse from deviation point 150 to rejoin point (or target) 130. Original route 120 has been planned pre-mission based on available information at the time of planning. Route 120 is planned to keep a risk level low for aircraft 110 by remaining clear of planned threat 170. As aircraft 110 approaches deviation point 150, an un-planned threat 140 emerges causing an unplanned level of risk for aircraft should aircraft 110 remain on original route 120. Embodiments of the risk aware contingency flight re-planner may assist a decision maker (here the pilot of aircraft 110) by offering alternate routes 122 and 124 for aircraft 110 to remain clear of both planned threat 170 and unplanned threat 140.

Figure 2:
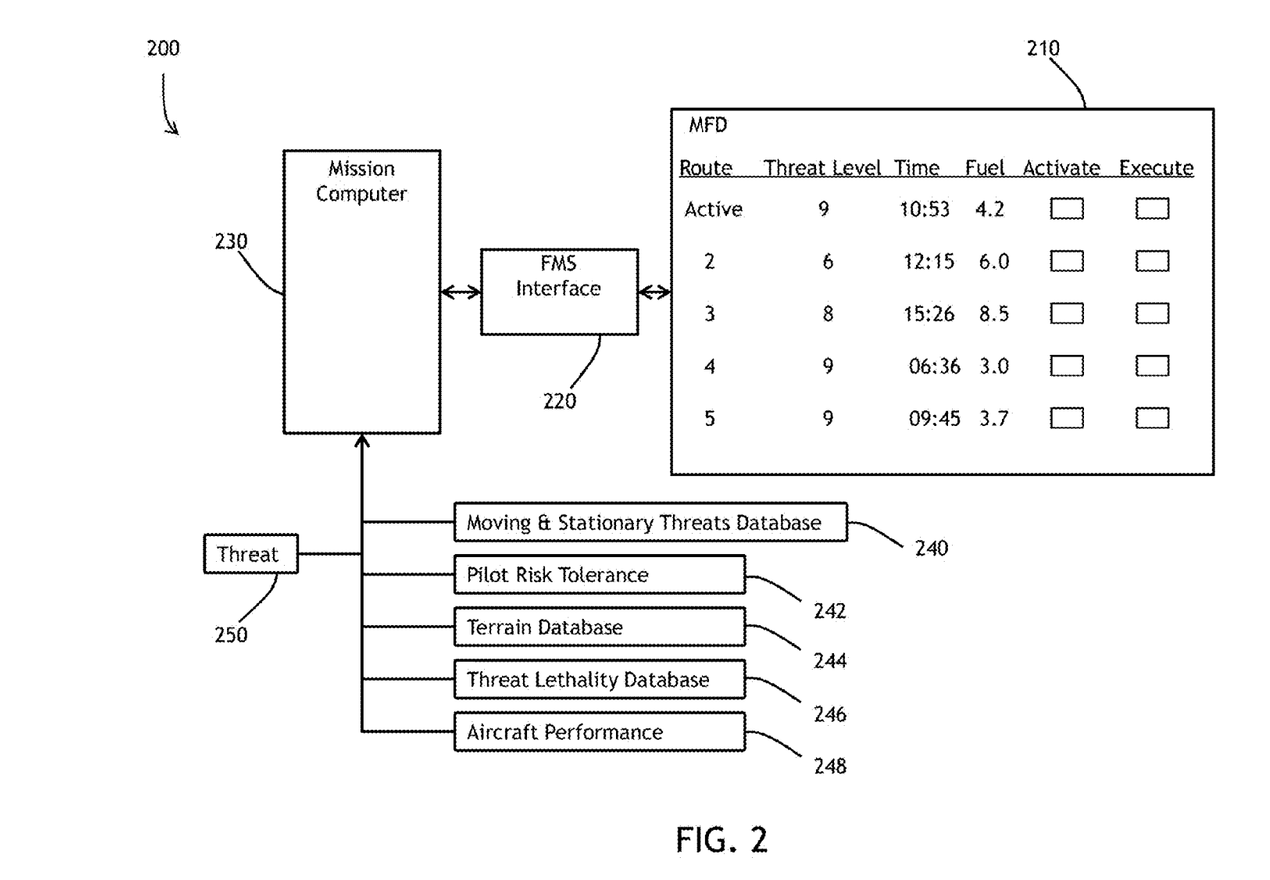
FIG. 2 is a block diagram of component parts onboard a vehicle in accordance with preferred embodiment of the present invention.

Referring to FIG. 2, block diagram of component parts onboard a vehicle in accordance with preferred embodiment of the present invention is shown. In one implementation of the risk aware contingency flight re-planner, all aspects of the system and method are configured to operate within lightweight computing resources onboard small fighter aircraft. An onboard mission computer 230 may house the computer readable code and computing resources to manage the system and method. Preferably inputs to the system may include a database of moving and stationary threats 240, a risk tolerance of the pilot or decision maker 242, a terrain database 244, a threat lethality database 246, performance characteristics and limitations of the vehicle or aircraft 248, and an indication of a threat 250.

Output from mission computer 230 may be in a format recognizable by current avionics devices. Such devices may accept data in a format similar to an ARINC standard of avionics data. However, should a specific Flight Management System (FMS) require a specific input, the risk aware contingency flight re-planner may further include a FMS interface 220 to alter the output to conform to the specific input. Multi-Function Display (MFD) 210 may present details to the decision maker of alternate risk-aware re-routes.

Contemplated herein, the decision maker may preferably be onboard the aircraft (ship, vehicle, etc.). Also contemplated herein, the decision maker may be physically located offboard the aircraft. For example, one decision maker may be the single-seat pilot onboard the aircraft. Additionally, in a multi seat configured aircraft, a mission commander or Captain may be the decision maker while not necessarily located within the cockpit of an aircraft and in manipulation of the controls. Additionally, an offboard decision maker may be in control of the vehicle via data link and able to select a re-route offered by the risk aware system.

Figure 3:
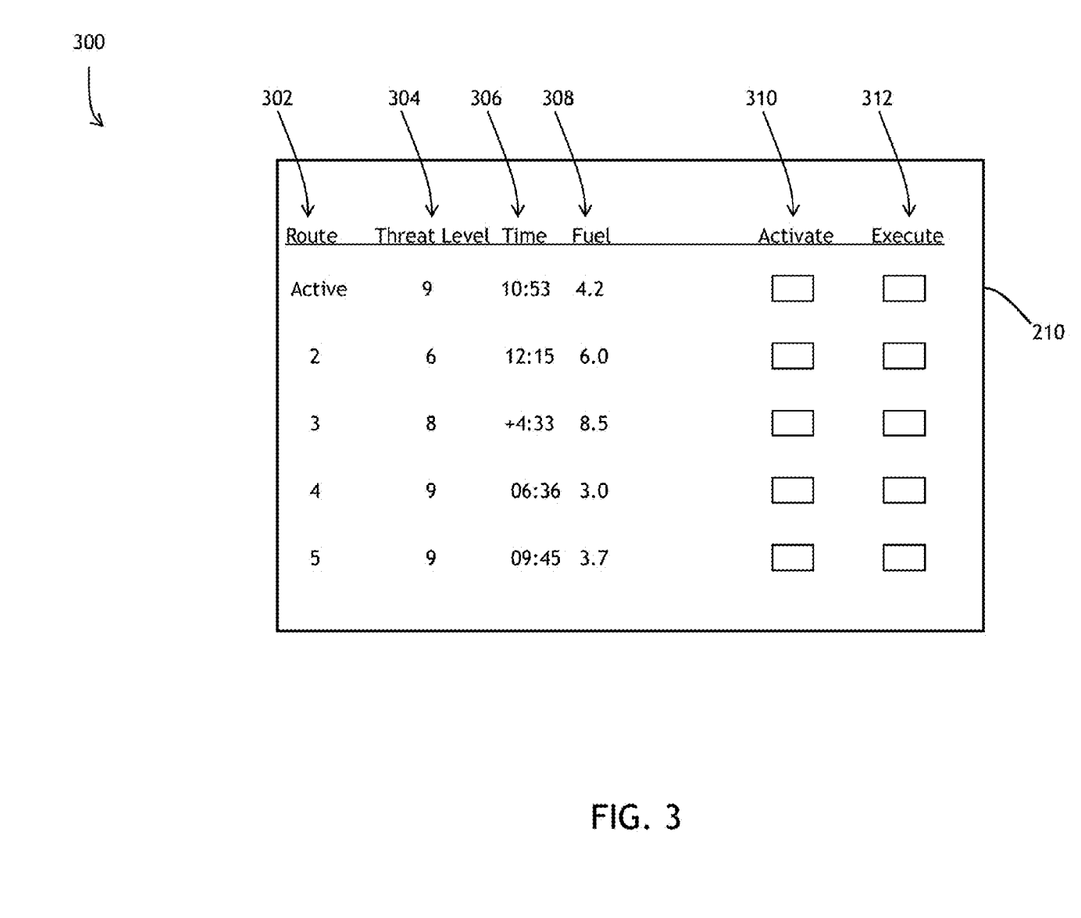
FIG. 3 is a diagram of a multi-function display (MFD) in accordance with a preferred embodiment of the present invention.

Referring to FIG. 3, diagram of a multi-function display (MFD) in accordance with a preferred embodiment of the present invention is shown. MFD 210 may be the preferable communication device configured for communication of information from the risk-aware contingency flight re-planner to an onboard decision maker. One example of information communicated may include a hierarchy of routes displayed in an order. One order may include the active route at the top followed by routes in order of increasing risk to the vehicle. For example, the second route displayed may be of equal or lesser risk than the third route.

Displayed route choices may include additional information to aid the decision maker in a re-route decision. As indicated, route number 302, a threat level associated with each route 304, the time required (or delta from current en route time) for completion of the route 306, fuel required (or delta) 308, and well-known touch screen options to activate 310 and execute 312 the newly chosen route.

Hazard Representation with ELDETREE

Embodiments of the present invention may preferably adapt Airborne E* to generate risk-aware paths. The 4-D states (or cells) of the ELevation inDExed quadTREE (ELDETREE: a quadtree-type hierarchical structure) are based on ELDETREE inputs embedded with risk and threat (lethality) information. The ELDETREE method: 1) recursively divides a region based on the current size of the region and the obstacle status of the region and 2) recursively merges nodes based on the difference between the minimum and maximum obstacle elevations) to include lethality information. The ELDETREE partitions each geographic reference into "leaf nodes" which are 3-D cubic volumes of variable size which contain a double array of elevation/time indices used to discretize altitude and time.

Figure 4A:
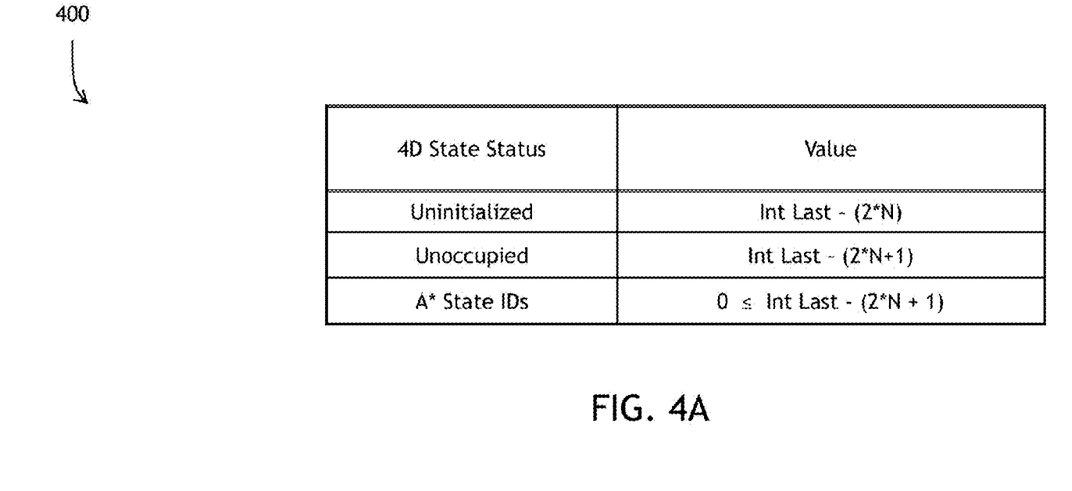
FIG. 4A is a table of Unoccupied 4-D (3-D plus time) States indicating a 4-D state status and value in accordance with a preferred embodiment of the present invention.

Referring to FIG. 4A, a table of Unoccupied 4-D (3-D plus time) States indicating a 4-D state status and value in accordance with a preferred embodiment of the present invention is shown. The status of each 4-D state is preferably stored as an unsigned 32-bit integer and contains one of the five following statuses:

a. Uninitialized
b. Unoccupied
c. A* State ID
d. Occupied needs terrain mask check
e. Occupied Uninitialized Status An uninitialized status may be defined herein as a status where a 4-D state has not been visited by the A* planner of the system 200 yet. The A* planner of system 200, as described in presentation entitled "Intelligent Hazard Avoidance System (IHAS)," 28th Digital Avionics Systems Conference, given by Young, S. Y., on Oct. 25-29, 2009, is a well-known Artificial Intelligence (AI) algorithm used to create a reference path, which is incorporated by reference herein it its entirety.

Unoccupied Status

An unoccupied status as defined in the '068 Patent is a status where the ELDETREE leaf node's elevation/time index is free of terrain and any other obstacles, stationary or moving. If terrain masking is selected, the cell may be located within a threat zone, but masked by terrain relative to threats.

A* State ID

The A* State ID status is defined in the IHAS as a status in which a global planner of system 200, labeled A*, has given a leaf node a 4-D connectivity ability. After a leaf node maintains an A* State ID, additional A* State ID leaf nodes may be able to connect to the leaf node to form a 4-D path.

Figure 4B:
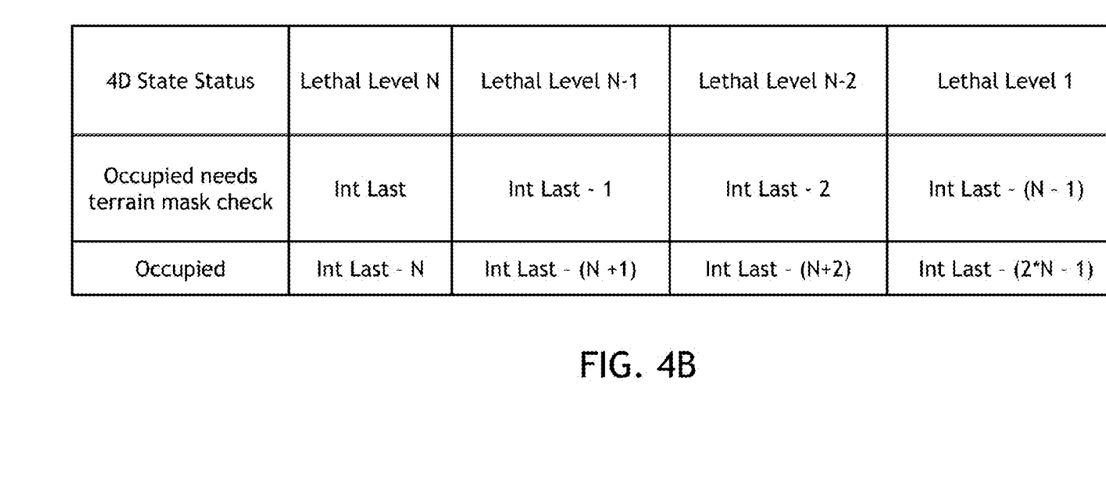
FIG. 4B is a Lethality Table for Occupied 4-D States indicating a higher lethality level at alternative 4-D states statuses in accordance with a preferred embodiment of the present invention.

The next two statuses, Occupied needs terrain mask check and Occupied, are further classified with lethality levels for the method to offer path choices based on the lethality of each path. Referring to FIG. 4B, a Lethality Table for Occupied 4-D States indicating a higher lethality level at alternative 4-D states statuses in accordance with a preferred embodiment of the present invention is shown.

Occupied Status but not checked for terrain masking

This occupied status as defined in the '068 Patent as a status where the ELDETREE teal node's elevation/time index is occupied by a static obstacle. This state is only used when terrain masking check is turned on. This state is used to indicate to Airborne E* that the volume is inside the threat zone of a static man-made threat 250 (not terrain) and has not been checked by the terrain masking function. This is a temporary state that the re-planner could later designate as either unoccupied or occupied.

Occupied Status

An occupied status as defined in the '068 Patent as a status where the ELDETREE leaf node's elevation/time index is occupied by terrain and/or other obstacles. If terrain masking is selected, then this cell has been checked and found to be inside a threat zone and is also visible by a threat 250.

Should a 4-D state be within a threat zone, it is assigned a status of "Occupied" or "Occupied needs terrain mask check." Two different occupied statuses are needed to distinguish the need of terrain masking check on this 4-D state. When terrain masking is enabled, all states within threat zones are initially labeled as "Occupied needs terrain mask check." After the 4-D state is explored by system 200 and terrain masking check is performed, the 4-D state status is switched from "Occupied needs terrain mask check" to "Occupied" or "Unoccupied," depending on the terrain masking result.

When incorporating lethality into ELDETREE, the values for state status "Occupied" and "Occupied needs terrain mask check" are expanded by the lethality range, as shown in FIG. 4B. Each 4-D state in ELDETREE is assigned with a specific value listed in FIG. 4A and FIG. 4B, based on the lethality level and state status of this 4-D state. For example, when a 4-D state is within a threat zone and terrain masking is disabled, the value of this 4-D state may be simply set as Integer Last—(2N−1) through a table look-up, given the state status as "Occupied" and the lethality level as "Lethal Level 1." Similarly, for a specific value such as Integer Last—(2N−1), the lethality level and state status of this 4-D state may be quickly retrieved from ELDETREE as "Lethal Level 1" and "Occupied," respectively.

When terrain masking is checked on a 4-D state and the result is that this 4-D state is still occupied, the value of this state is changed to be the new state status ("Occupied") and its lethality level. The modification of a 4-D state that is transitioned from "Occupied needs terrain mask check" to "Occupied" can be quickly computed by subtracting the number of lethality levels from its original 4-D state value. The following equation may preferably indicate how to compute the new 4-D state value for this state transition.

$$L(\text{Occupied,TLL}) = L(\text{ONTMC,TLL}) - N$$

Where: L is the Lethality Table for Occupied 4-D States, Occupied represents the 4-D status state for "Occupied," TLL is the threat lethal level, ONTMC is the 4-D status state acronym for "Occupied needs terrain mask check," and N is the number of lethal levels.

Global Path Planner

Once the ELDETREE has been populated, the global path planner A* of system 200 preferably plans a reference path for further refinement later. For previous Airborne E* designs, A* planner only searches 4-D states in ELDETREE with values compliant with the following equation:

$$F(x,y,z,t) \leq \text{Unoccupied}$$

Where: $(x,y,z,t)$ is the value listed in FIG. 4A and FIG. 4B for the 4-D state at $(x,y,z,t)$.

To enable the global path planner A* of system 200 to consider states within a lethality level of a threat, a user must specify a Lethality Tolerance Level (LTL). For example, assume that the user may tolerate up to risk level of "Lethal Level 1." Then LTL may be defined as:

$$\text{LTL} = L(\text{Occupied,Lethal\_Level\_1})$$

Where: L is the lethality matrix in FIG. 4B for Occupied 4-D States, Occupied is the state status, and Lethal_Level_1 is the Lethal Level 1.

Thus, the system 200 A* planner is preferably updated to only search 4-D states that comply with the following:

$$F(x,y,z,t) \leq \text{LTL}$$

Where: x,y,z are coordinates for the state and t represents the traversal time at this 4-D state. The A* planner of system 200 not only needs to expand threat states with risk levels that are tolerable, but also preferably needs to find and present a reduced risk path. For example, if two possible paths may exist, and the first path involves traversing through a TLL=3 for 30 seconds and the second path is completely free of threats (i.e., TLL=0), but is 5 minutes longer and uses 33 lbs. more fuel, a further analysis of path cost will determine the answer.

The system 200 A* planner may preferably compare the path cost of traversing 30 seconds inside a threat zone of TLL=3 versus the path cost of traversing through area with TLL=0, but is 5 minutes longer and uses 33 lbs. more fuel. In addition to different threat levels, of system 200 also may analyze different risk types, such as fuel risk, time risk and threat risk, including an association of each risk type with a threat level.

System 200 may preferably assign an additional path cost for the time period of the re-routed path that is inside a threat zone. This additional path cost is added to traveling time to any 4-D state that has a TLL>0. The additional path cost of traversing through a threat zone is accounted for by:

$$ETC(Y) = TLL(Y) * \text{RiskFactor}(RTL, RT)$$

$$c(X,Y)' = c(X,Y) + t(X,Y) * ETC(Y)$$

Where: X and Y are 4-D states compliant with $F(x,y,z,t) \leq \text{LTL}$ above, ETC(Y) is the extra traversal cost per second, TLL(Y) is the Threat Lethal Level for state Y, RTL is the Risk Tolerance Level and is specified by operators, RT is the Risk Type and is specified by operators, RiskFactor(RTL,RT) is a factor to account for the additional path cost for traveling through lethal zones and is a function of RTL and RT, t(X,Y) is the traversal time from state Y to state X; c(X,Y) is the path cost from state Y to state X without the additional penalty of traversing through a threat zone, and c(X,Y)' is the path cost from state Y to state X with the additional penalty of traversing through a threat zone.

Each operator of the risk-aware contingency flight re-planner may preferably use different risk tolerance levels to accomplish a mission objective. In addition, different missions may require the path planner to use different tolerance levels. RiskFactor in the above equation may allow the determination of the additional path cost for traveling through lethal zones to be based on user preference (or tolerance), because RiskFactor is a function of the user specified values: RTL and RT.

Figure 5:
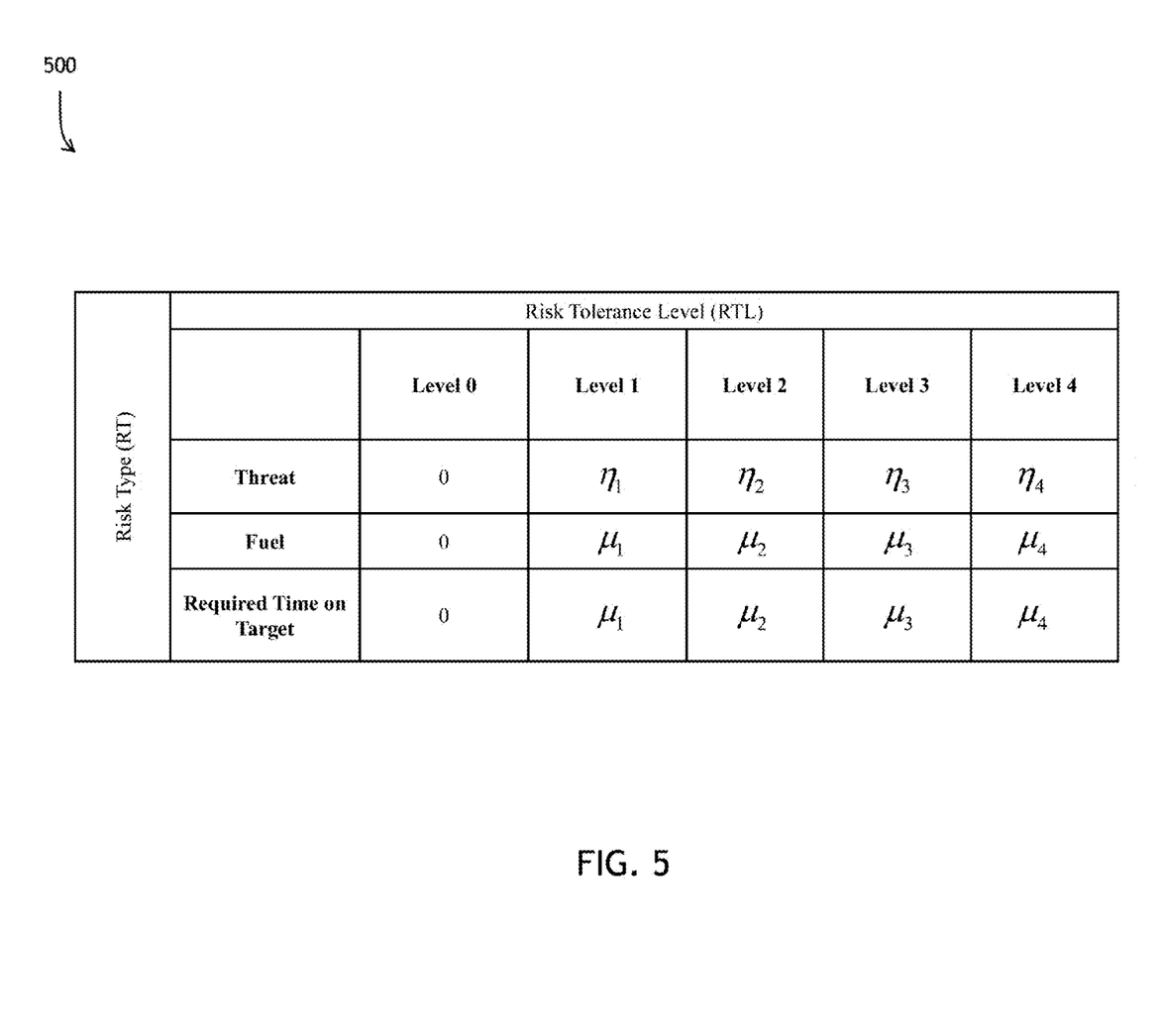
FIG. 5 is a table of exemplary Risk Type (RT) versus Risk Tolerance Level (RTL) displaying multiple levels of risk and associated values of RiskFactor in accordance with a preferred embodiment of the present invention.

Referring to FIG. 5, a table of exemplary Risk Type (RT) versus Risk Tolerance Level (RTL) displaying multiple levels of risk and associated values of RiskFactor in accordance with a preferred embodiment of the present invention is shown. FIG. 5 lists the values of RiskFactor currently used by Airborne E* for an exemplary three RTs and five lethal RTLs. It contemplated herein, unlimited number of RTs and unlimited number RTLs may be incorporated within the methods of the risk-aware contingency flight re-planner dependent upon onboard computing resources. Airborne E* may also preferably work with RiskFactor possessing values specifically tailored to a particular user. For example, a Level 2 RTL for one specific user may include entry into a target tracking radar range while a Level 3 RTL may include entry into the range of a surface to air missile. For a second user, Level 2 RTL may include entry into an area of severe turbulence. In FIG. 5, $\eta_i$ and $\mu_i$ are determined as follows:

For $i = 0:4$ if $i \leq RTL_u$ then $\eta_i = 0$ $\mu_i = 1$ else $\eta_i = \infty$ $\mu_i = \infty$ Where: $RTL_u$ is the user specified RTL value.

Fuel risk is one type of risk that is of consistent importance to operators of vehicles, and particularly important to operators of an airborne vehicle. Fuel risk captures the risk of running out of fuel because the re-routed path is too long, even if the re-routed path is completely free of threats. Capturing the exact fuel burn for each flight leg is quite complicated since fuel burn may depend on a number of variables, such as temperature, density of air and aircraft weight. For simplicity and computational efficiency, A* planner of system 200 may preferably use an average fuel flow with a constant velocity to calculate the approximate fuel consumption of the re-routed path. At the path refinement stage, the system 200 may determine a more accurate fuel burn for each flight leg. The first step for fuel risk is to determine how much fuel is available for a re-routed segment. The following equation may preferably determine the fuel available for the re-routed path segment:

$$\text{Fuel}_{avail} = \text{TFOB} - \text{Fuel}_{FP} + \text{Fuel}_{DP}^{RP}$$

Where: TFOB is the total fuel on board the aircraft, $\text{Fuel}_{FP}$ is the fuel consumed by the active flight plan from the current aircraft location onward to the destination, and $Fuel_{DP}^{RP}$ is the fuel consumed between the deviation point 150 and the rejoin point 130 of the active flight plan.

Time risk captures the required time on target (RToT) constraint that is placed on a waypoint (or target) and may be computed together with fuel risk since both of them depend on the available fuel. With an RToT constraint, the aircraft may not be able to deviate too far away from the active flight path during re-route. System 200 considers fuel and time risks with the following equations:

$$Time_{avail} = min(RTot, Fuel_{avail}/FF_{avg})$$

$$t(Y,DP) = t(X,DP) + t(X,Y)$$

$$c(X,Y)' = \begin{bmatrix} c(X,Y) + t(X,Y) * ETC(Y) * OTF, & t(Y,DP) > Time_{avail} \\ c(X,Y) + t(X,Y) * ETC(Y), & t(Y,DP) \leq Time_{avail} \end{bmatrix}$$

Where: RToT is the required time on target constraint in terms of elapsed time from the deviation point, $FF_{avg}$ is the average fuel flow, t(X,DP) is the accumulated time from the deviation point to the current state, t(X,Y) is the time period it takes to travel from state Y to state X, c(X,Y) is the arc cost from state Y to state X without additional penalty, ETC(Y) is the extra traversal costs to travel to state Y, OTF (OverTime-Factor) is the factor to penalize a 4-D state for exceeding available fuel or RToT. The OverTimeFactor value is set as the highest lethal level since this situation should be treated as the most dangerous condition.

Path Refinement

System 200 may further refine the candidate paths based on additional input from the A* planner. The path refinement stage of Airborne E* must be modified similar to A* planner of system 200 to accept an input of different RTs and RTLs. Thus, for a 4-D state to be part of a path candidate G, it must comply with:

$$S = F(x,y,z,t)$$

$S \leq LTL$, $\forall S \not\subseteq G$

Where: S represents a 4-D state, F(x,y,z,t), in the ELDE-TREE, LTL is lethality tolerance level, $\forall S$ represents all 4-D states of S, and G is one feasible path solution.

Path refinement may preferably utilize a well-known Genetic Algorithm (GA) to ensure the final selected route will comply with flight constraints where fuel or time is already used in the fitness calculation. The GA is described in detail in the '068 Patent. Additional cost is added to the path cost to account for different threat levels and enable the planner to minimize the risk exposure time. For example:

$$Threat\_Exposure(G) = t(S) * ETC(S), \forall S \not\subseteq G$$

$$Path\_Cost(G)' = (|Path\_Cost(G) - RToT| + Threat\_Exposure(G))$$

Where: t(S) is the time period for traversing within state S, ETC(S) is the extra traversal cost for state S due to threats, Path_Cost(G) is the path traversal time for path candidate G, RToT is the required time on target, if there is an RToT requirement. If there is no RToT constraint, system 200 will set RToT to zero.

Exemplary Scenario

Figure 6:
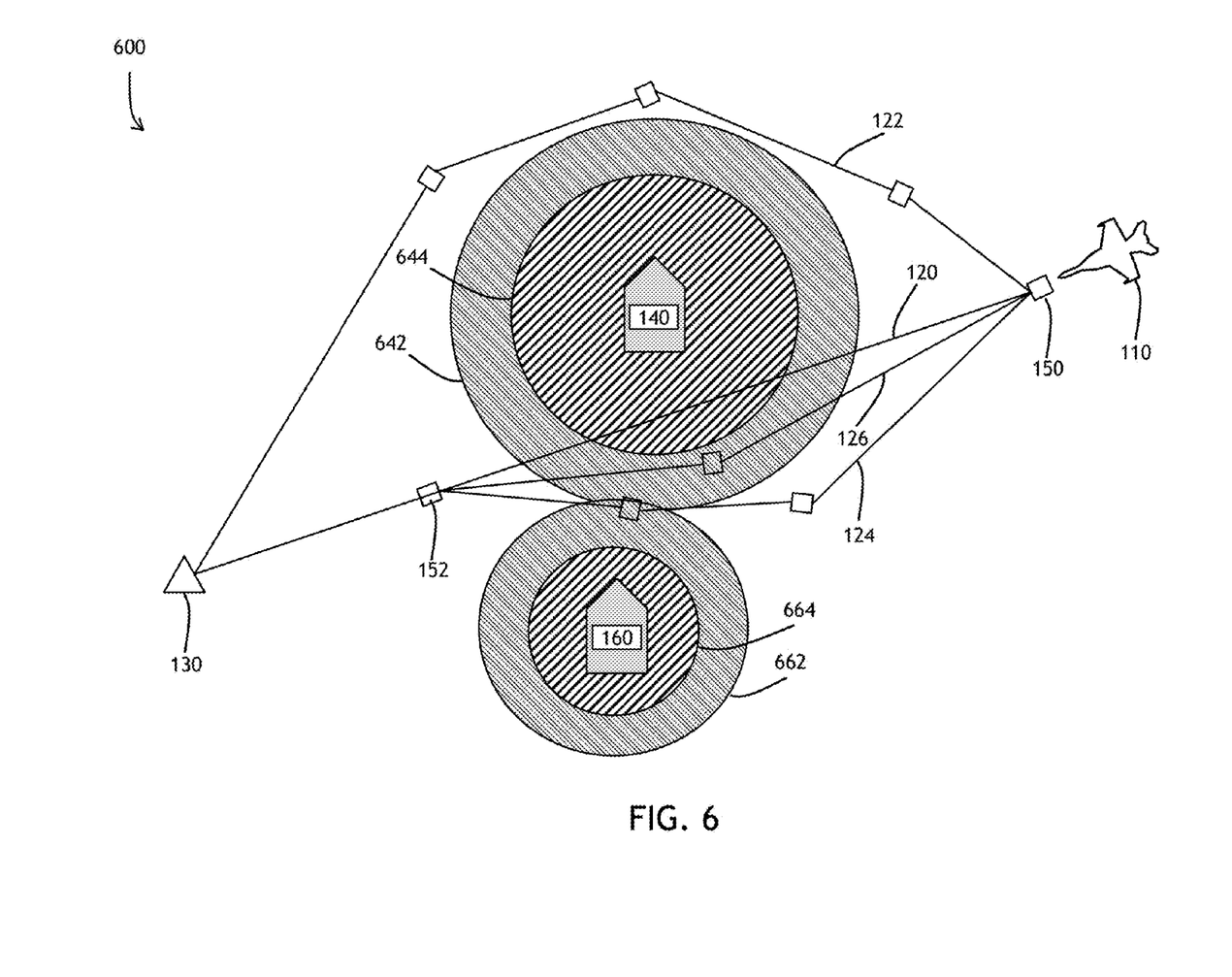
FIG. 6 is a diagram of obstacles which intersect an active planned flight path and risk aware alternative re-routes for the aircraft in accordance with a preferred embodiment of the current invention.

Referring to FIG. 6, a diagram of obstacles which intersect an active planned flight path and risk aware alternative re-routes for the aircraft in accordance with a preferred embodiment of the current invention is shown. At departure time, aircraft 110 is assigned an original route 120 to traverse from deviation point 150 to rejoin point 130. After departure, threats emerge along the active original route 120. Threats 140 and 160 are unplanned threats and pose an unplanned level of risk to aircraft 110. Surrounding each threat 140, 160, shapes (here circular) of risk levels indicate multiple levels of risk associated with each threat. A first level of risk shape 642 may indicate a first level of risk while a greater level of risk may be indicated by shape 644. For example, shape 642 may represent a target tracking radar of a surface to air missile system while shape 644 may indicate an engagement zone of the missile system. The engagement zone would naturally present a higher level of risk than would the target tracking radar. Should aircraft 110 continue on planned route 120, a high level of risk would be encountered within the engagement zone of the surface to air missile system placing the aircraft 110 in a possible dangerous situation.

The risk-aware contingency flight re-planner may operate to offer a decision maker a choice of risk aware alternate routes. Several exemplary alternate routes are indicated in FIG. 6. Each of the alternate routes may offer the decision maker a variable level of risk. Should $Fuel_{avail}$ and RToT be not the limiting factors, risk aware alternate route 122 may be a first choice of the decision maker as route 122 remains clear of all threats. However, route 122 requires substantially more fuel and time than one of the alternative choices.

Route 124 may offer one option to the decision maker. As indicated, route 124 remains clear of shape 642 while it does traverse shape 662. For example, shape 662 may indicate light rain showers while shape 664 represents heavy thunderstorm activity. The decision may prove beneficial to aircraft 110 to accept the lower risk of light rain showers 662 than to allow an unfriendly entity to track the aircraft with a target tracking radar 642.

Should $Fuel_{avail}$ or RToT be the limiting factors, risk aware alternate route 126 may be a first choice of the decision maker. Distance from deviation point 150 to rejoin point 130 through waypoint 152 is the shortest as indicated by original route 120. The shortest time and fuel based alternative risk aware re-route may be route 126. Although reroute 126 may traverse shape 642, the traversal of shape 642 (target tracking radar) may be of lesser risk than would a deviation from an assigned RToT or a traversal of shape 644 (missile engagement zone).

Further, RToT may occasionally be a window of time within which the aircraft must be at a specific rejoin point 130. Route 126 and 124 may offer the decision maker the ability to arrive at rejoin point 130 within the assigned RToT window while route 122 may not.

Figure 7:
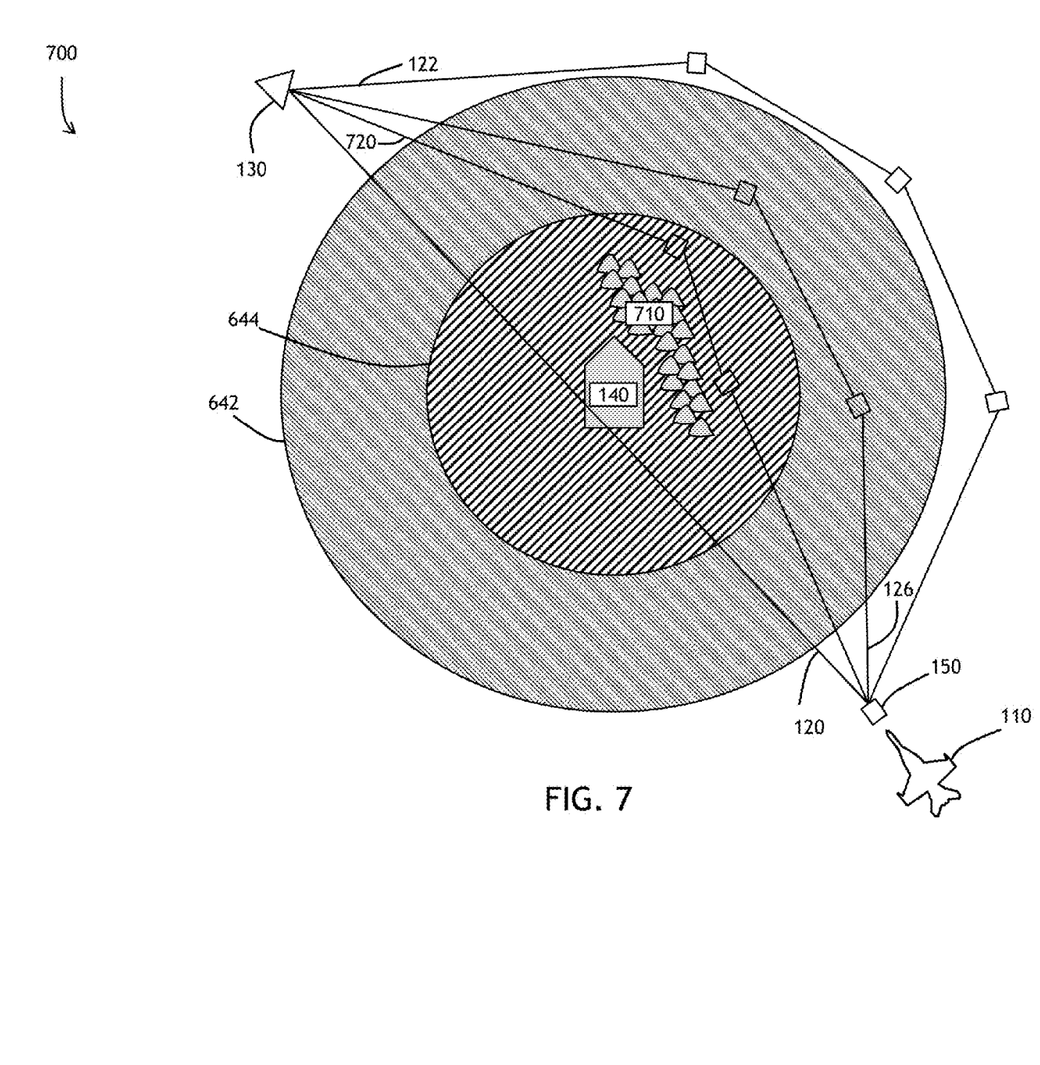
FIG. 7 is a diagram of obstacles which intersect a planned flight path and alternative terrain masking re-routes of the aircraft in accordance with a preferred embodiment of the present invention.

Referring to FIG. 7, a diagram of obstacles which intersect a planned flight path and alternative terrain masking re-routes of the aircraft in accordance with a preferred embodiment of the present invention is shown. Terrain 710 offers additional options to the decision maker. Here, risk-aware alternative route 720 may traverse shape 644. The unoccupied status of states comprising risk-aware re-route 720 may lead ELDE-TREE to generate and present route 720 to the decision maker as one recommended option.

Risks from alternate threats may offset the quality of a given route. The fuel risk of an aircraft flying route 122 may be the same as the threat or terrain risk of an aircraft flying route 720. Time risk of route 720 may be the same as threat 140 risk of route 120. As above, should there be an RToT, a Time Risk may preclude selection and presentation of route 720 since the distance of route 720 may be too great to ensure accurate arrival at rejoin point 130.

Figure 8:
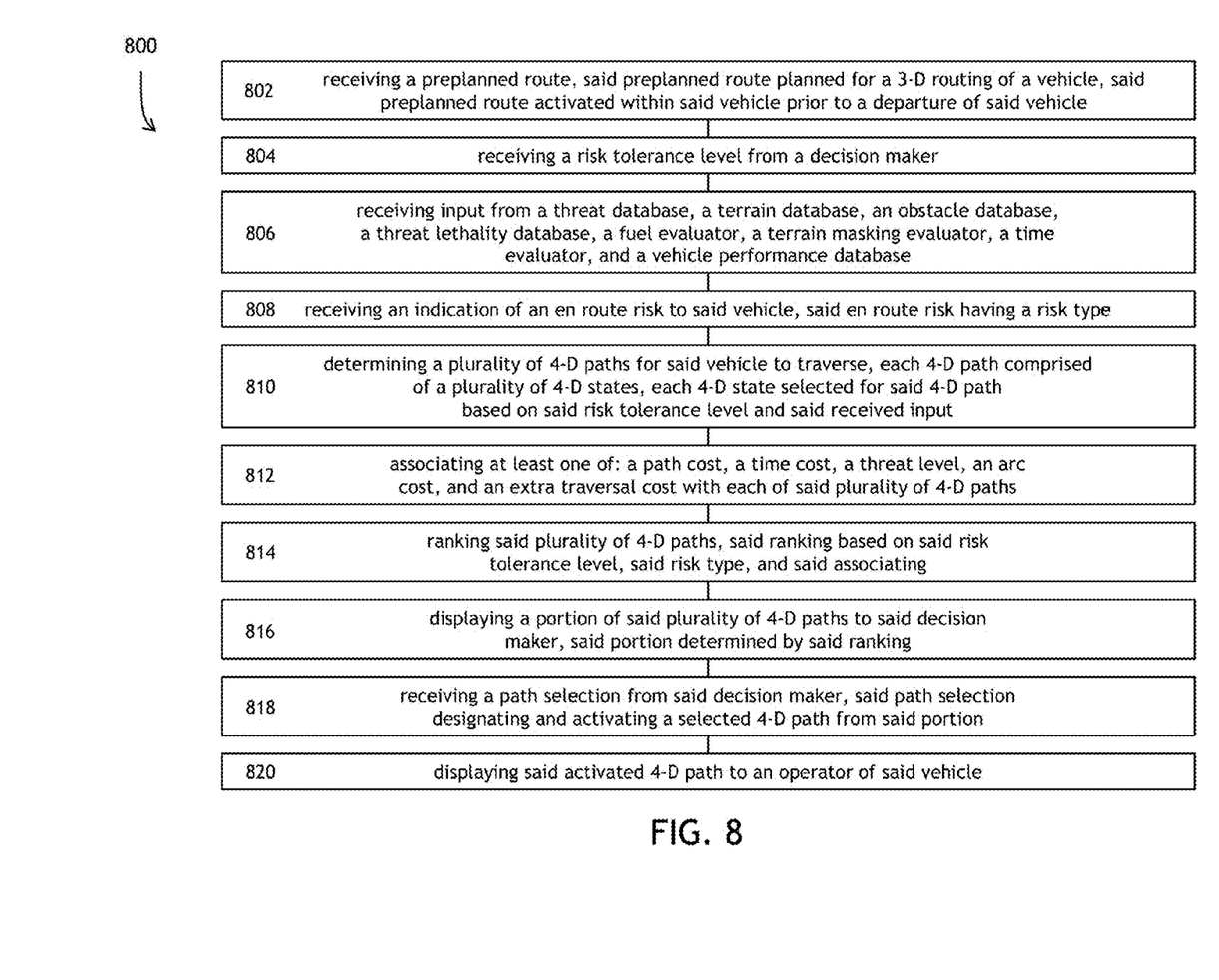
FIG. 8 is a flow diagram of a method for risk aware contingency flight re-routing representative of a preferred embodiment of the present invention.

Referring to FIG. 8, a flow diagram of a method for risk aware contingency flight re-routing representative of a preferred embodiment of the present invention is shown. Method 800 may begin with, at step 802, receiving a preplanned route, the preplanned route planned for a 3-D routing of a vehicle, the preplanned route activated within the vehicle prior to a departure of the vehicle, at step 804, receiving a risk tolerance level from a decision maker, at step 806, receiving input from a threat database, a terrain database, an obstacle database, a threat lethality database, a fuel evaluator, a terrain masking evaluator, a time evaluator, and a vehicle performance database, at step 808, receiving an indication of an en route risk to the vehicle, the en route risk having a risk type, at step 810, determining a plurality of 4-D paths for the vehicle to traverse, each 4-D path comprised of a plurality of 4-D states, each 4-D state in each 4-D path selected for the 4-D path based on the risk tolerance level and the received input, at step 812, associating at least one of: a path cost, a time cost, a threat level, an arc cost, and an extra traversal cost with each of the plurality of 4-D paths, at step 814, ranking the plurality of 4-D paths, the ranking based on the risk tolerance level, the risk type, and the associating, at step 816, displaying a portion of the plurality of 4-D paths to the decision maker, the portion determined by the ranking, at step 818, receiving a path selection from the decision maker, the path selection designating and activating a selected 4-D path from the portion, and, at step 820, displaying the activated 4-D path to an operator of the vehicle.

CONCLUSION

Specific blocks, sections, devices, functions, processes and modules may have been set forth. However, a skilled technologist will realize that there are many ways to partition the system, and that there are many parts, components, processes, modules or functions that may be substituted for those listed above.

While the above detailed description has shown, described and pointed out the fundamental novel features of the invention as applied to various embodiments, it will be understood that various omissions and substitutions and changes in the form and details of the system illustrated may be made by those skilled in the art, without departing from the intent of the invention. The foregoing description details certain embodiments of the invention. It will be appreciated, however, that no matter how detailed the foregoing appears, the invention may be embodied in other specific forms without departing from its spirit or essential characteristics. The described embodiment is to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A method for risk-aware contingency flight re-planning, comprising:
   receiving a preplanned route, said preplanned route planned for a 3-D routing of a vehicle, said preplanned route activated within said vehicle prior to a departure of said vehicle;
   receiving a risk tolerance level from a decision maker;
   receiving input from a threat database, a terrain database, an obstacle database, a threat lethality database, a fuel evaluator, a terrain masking evaluator, a time evaluator, and a vehicle performance database;
   receiving an indication of an en route risk to said vehicle, said en route risk having a risk type;
   determining a plurality of 4-D paths for said vehicle to traverse, each 4-D path comprised of a plurality of 4-D states, each 4-D state selected for said 4-D path based on said risk tolerance level and said received input;
   associating at least one of: a path cost, a time cost, a threat level, an arc cost, and an extra traversal cost with each of said plurality of 4-D paths;
   ranking said plurality of 4-D paths, said ranking based on said risk tolerance level, said risk type, and said associating;
   displaying a portion of said plurality of 4-D paths to said decision maker, said portion determined by said ranking;
   receiving a path selection from said decision maker, said path selection designating and activating a selected 4-D path from said portion; and
   displaying said activated 4-D path to an operator of said vehicle.

2. The method for risk-aware contingency flight re-planning of claim 1, wherein said preplanned route planned for a 3-D routing of a vehicle further comprises a 3-D route planned for an aircraft.

3. The method for risk-aware contingency flight re-planning of claim 1, wherein said preplanned route planned for a 3-D routing of a vehicle further comprises a 4-D path, a 3-D path, and a 2-D path.

4. The method for risk-aware contingency flight re-planning of claim 1, wherein said risk tolerance level further comprises a plurality of levels of risk tolerance, the plurality of levels of risk tolerance based on said input from said decision maker.

5. The method for risk-aware contingency flight re-planning of claim 1, wherein said received input further comprises an attribute of a medium through which said vehicle is designed to traverse.

6. The method for risk-aware contingency flight re-planning of claim 1, wherein said indication of an en route risk to said vehicle further comprises an indication of a hostile surface threat, a weather threat, a hostile airborne and space-based threat, and a subsurface threat.

7. The method for risk-aware contingency flight re-planning of claim 1, wherein said a risk type further comprises one of: a threat risk, a fuel risk, and a required time on target risk.

8. The method for risk-aware contingency flight re-planning of claim 1, wherein said receiving an indication further comprises a reception via one of: a digital or analog data link, a VHF signal, and a satellite communications system.

9. The method for risk-aware contingency flight re-planning of claim 1, wherein said plurality of 4-D paths for said vehicle to traverse further comprises at least one path which remains clear of each of said en route risk to said vehicle.

10. The method for risk-aware contingency flight re-planning of claim 1, wherein said decision maker is said operator.

11. The method for risk-aware contingency flight re-planning of claim 1, wherein said displaying a portion of said plurality of 4-D paths to said decision maker further comprises an output configured for an ARINC standard and readable by a specific flight management system.

12. A computer readable medium having non-transitory computer readable program code embodied therein for risk-aware contingency flight re-planning, the computer readable program code comprising instructions which, when executed by a computer device or processor, perform and direct the steps of:
   receiving a preplanned route, said preplanned route planned for a 3-D routing of a vehicle, said preplanned route activated within said vehicle prior to a departure of said vehicle;
   receiving a risk tolerance level from a decision maker;

receiving input from a threat database, a terrain database, an obstacle database, a threat lethality database, a fuel evaluator, a terrain masking evaluator, a time evaluator, and a vehicle performance database;

receiving an indication of an en route risk to said vehicle, said en route risk having a risk type;

determining a plurality of 4-D paths for said vehicle to traverse, each 4-D path comprised of a plurality of 4-D states, each 4-D state selected for said 4-D path based on said risk tolerance level and said received input;

associating at least one of: a path cost, a time cost, a threat level, an arc cost, and an extra traversal cost with each of said plurality of 4-D paths;

ranking said plurality of 4-D paths, said ranking based on said risk tolerance level, said risk type, and said associating;

displaying a portion of said plurality of 4-D paths to said decision maker, said portion determined by said ranking;

receiving a path selection from said decision maker, said path selection designating and activating a selected 4-D path from said portion; and displaying said activated 4-D path to an operator of said vehicle.

13. The computer readable medium of claim 12, wherein said preplanned route planned for a 3-D routing of a vehicle further comprises a 3-D route planned for an aircraft.

14. The computer readable medium of claim 12, wherein said preplanned route planned for a 3-D routing of a vehicle further comprises a 4-D path, a 3-D path, and a 2-D path.

15. The computer readable medium of claim 12, wherein said risk tolerance level further comprises a plurality of levels of risk tolerance, the plurality of levels of risk tolerance based on said input from said decision maker.

16. The computer readable medium of claim 12, wherein said received input further comprises an attribute of a medium through which said vehicle is designed to traverse.

17. The computer readable medium of claim 12, wherein said indication of an en route risk to said vehicle further comprises an indication of a hostile surface threat, a weather threat, a hostile airborne and space-based threat, and a subsurface threat.

18. The computer readable medium of claim 12, wherein said a risk type further comprises one of: a threat risk, a fuel risk, and a required time on target risk.

19. The computer readable medium of claim 12, wherein said receiving an indication further comprises a reception via one of: a digital or analog data link, a VHF signal, and a satellite communications system.

20. The computer readable medium of claim 12, wherein said plurality of 4-D paths for said vehicle to traverse further comprises at least one path which remains clear of each of said en route risk to said vehicle.

21. The computer readable medium of claim 12, wherein said decision maker is said operator.

22. The computer readable medium of claim 12, wherein said displaying a portion of said plurality of 4-D paths to said decision maker further comprises an output configured for an ARINC standard and readable by a specific flight management system.

\* \* \* \* \*